United States Patent
Eisele et al.

(10) Patent No.: US 7,959,536 B2
(45) Date of Patent: Jun. 14, 2011

(54) METHOD FOR SHIFTING A MOTOR VEHICLE AUTOMATIC TRANSMISSION WITH A HYDRODYNAMIC TORQUE CONVERTER WHEN THE VEHICLE COMES TO A STOP

(75) Inventors: Markus Eisele, Friedrichshafen (DE); Franz Sorg, Langenargen (DE); Harry Nolzen, Tettnang (DE); Jürgen Blaser, Meckenbeuren (DE); Thomas Vogt, Em.-Liptingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 853 days.

(21) Appl. No.: 11/914,470

(22) PCT Filed: Jun. 7, 2006

(86) PCT No.: PCT/EP2006/005417
§ 371 (c)(1),
(2), (4) Date: Nov. 15, 2007

(87) PCT Pub. No.: WO2006/133834
PCT Pub. Date: Dec. 21, 2006

(65) Prior Publication Data
US 2008/0227600 A1    Sep. 18, 2008

(30) Foreign Application Priority Data
Jun. 11, 2005 (DE) .......................... 10 2005 027 098

(51) Int. Cl.
*F16H 59/54* (2006.01)
(52) U.S. Cl. ........................................... 477/94
(58) Field of Classification Search .................. 477/94
See application file for complete search history.

(56) References Cited

U.S. PATENT DOCUMENTS

| | | | | |
|---|---|---|---|---|
| 4,503,733 A * | 3/1985 | Hasegawa | ....................... | 477/114 |
| 4,526,065 A * | 7/1985 | Rosen et al. | ..................... | 477/93 |
| 4,965,728 A * | 10/1990 | Leising et al. | ................... | 701/58 |
| 5,803,869 A * | 9/1998 | Jamzadeh et al. | ............. | 477/168 |
| 6,270,443 B1 * | 8/2001 | Ito et al. | ........................ | 477/114 |
| 6,317,671 B1 | 11/2001 | Tsutsui et al. | | |
| 6,494,808 B2 * | 12/2002 | Lee | ................................ | 477/94 |
| 6,719,664 B2 | 4/2004 | Ito et al. | | |
| 6,835,164 B2 | 12/2004 | Habeck | | |
| 7,044,890 B2 * | 5/2006 | Kojima et al. | ................. | 477/175 |
| 2005/0021208 A1 * | 1/2005 | Nagai et al. | ...................... | 701/54 |
| 2005/0027424 A1 * | 2/2005 | Matsubara et al. | .............. | 701/51 |

(Continued)

FOREIGN PATENT DOCUMENTS

DE         100 20 147 A1     11/2000

(Continued)

*Primary Examiner* — Sherry Estremsky
(74) *Attorney, Agent, or Firm* — Davis & Bujold, P.L.L.C.

(57) ABSTRACT

A method of shifting an automatic transmission of a motor vehicle having a hydrodynamic converter (6). The method comprising the steps of detecting a presence of predetermined stopping conditions; determining that a driver of the motor vehicle intends to cause the motor vehicle to change from a driving state to a stopped state, based on the presence of one of the predetermined stopping conditions; and automatically shifting the automatic transmission (8) into a standby mode, before the driving state has concluded. The shifting into the standby mode typically occurs when a rotational speed of the hydrodynamic converter (6) decreases to less than a rotational speed (120) of a motor and the retarder apparatus (10), of the automatic transmission, is disengaged no later than a time by which shifting into the standby mode occurs.

9 Claims, 2 Drawing Sheets

U.S. PATENT DOCUMENTS

| | | | |
|---|---|---|---|
| 2008/0020896 A1* | 1/2008 | Kamishima | 477/117 |
| 2008/0172161 A1* | 7/2008 | Kondo et al. | 701/66 |
| 2008/0305929 A1* | 12/2008 | Koga | 477/115 |
| 2009/0023552 A1* | 1/2009 | Ohtake et al. | 477/93 |
| 2009/0170616 A1* | 7/2009 | Souda et al. | 464/162 |
| 2009/0312927 A1* | 12/2009 | Ishiwada | 701/60 |

FOREIGN PATENT DOCUMENTS

| | | |
|---|---|---|
| DE | 102 39 884 A1 | 5/2003 |
| DE | 102 31 817 A1 | 2/2004 |
| DE | 103 42 179 B3 | 1/2005 |
| EP | 1 158 221 A2 | 4/2001 |
| WO | WO/0070318 | 11/2000 |

* cited by examiner

METHOD FOR SHIFTING A MOTOR VEHICLE AUTOMATIC TRANSMISSION WITH A HYDRODYNAMIC TORQUE CONVERTER WHEN THE VEHICLE COMES TO A STOP

This application is a national stage completion of PCT/EP2006/005417 filed Jun. 7, 2006, which claims priority from German Application Serial No. 10 2005 027 098.0 filed Jun. 11, 2005.

FIELD OF THE INVENTION

The invention concerns a method for shifting an automatic transmission of a motor vehicle, having a hydrodynamic, torque converter, (hereinafter, "converter") during a stop of the vehicle following a driving motion, under circumstances where preselected specified stopping conditions are present, the transmission automatically shifts into a preparatory restart state (hereinafter referred to as "standby mode").

BACKGROUND OF THE INVENTION

Conventionally, known automatic transmissions are made to remain in an already functioning gear ratio while coming to a stop. In detail, this means that the power connection, between the vehicle motor and the drive wheels, remains in a current state, until the vehicle comes to a stop. Following a preselected dwell time (for example, this being two seconds after the vehicle stops), due to additional conditions made available during a stop, where a gas pedal is not activated and the vehicle is motionless, the transmission shifts into the above mentioned standby mode. In this standby mode, the transmission can transfer very little torque.

When stopping a motor vehicle with such an automatic transmission, the following driving conditions play a role.

Upon braking the vehicle, in many cases, a mechanical clutch arrangement, which bypasses the hydrodynamic converter, is disengaged with the result that input torque is now passed through the converter. As this occurs, the converter must deal with the idling engine running, where the torque passed to the drivetrain must now travel through the converter. At this timer the converter is in an idling operation and as the torque from the drive wheels of the previously rapidly traveling vehicle is now being transferred in the reverse direction through the converter to the motor, which is now idling. If the forward speed of the vehicle further declines, a point is reached, wherein the rotational speed of the converter turbine (hereinafter "turbine"), which is coupled with the drive wheels by the transmission, is approximately the same as the rotational speed of the converter pump (hereinafter "pump") which is directly bound to the motor. In this equality of rotational speeds, the power train is torque-free.

If the vehicle is additionally braked and thereby the rotational speed of the turbine is further diminished, then the converter must cope with the idling speed. This means that the motor, limited to a rotational speed by during idling, receives torque from the converter and the transmission, which is generated by the normally driven wheels. The effects of which must be braked by the service brake. Under these conditions, a downshift of the transmission, most likely from the second gear ratio into the first gear ratio (RS 2-1) must be carried out, where the tractional torque is again reduced. If the vehicle continues to slow down, a resurgence in tractional torque suddenly occurs so that the vehicle must be more strongly braked again with the service brakes to offset this torque transmitted into the idling motor through the transmission and the converter. The attendant result brings about an unnecessary and wasteful consumption of fuel.

Introduced into the converter, the torque converts itself to wasteful heat, practically to the extent of 100%. This accumulation of heat appears during driving by way of problems such as unfavorable cooling conditions during travel; a reduced throughput of oil in the transmission; diminished cooling water circulation, and a reduction of cooling air.

An additional problem can be seen therein, in that, as a result of tractional torque being developed by the motor being sent through the converter to the drive wheels, the braking capability at the powered axle is diminished and the respective other axle can develop a tendency of being locked.

As has already been described and explained, after stopping the vehicle and when additional stopping conditions are in force, the transmission necessarily follows a preselected dwell time and shifts into the standby mode. If the vehicle stops, during a climb, the driver has a tendency to release pressure on the brake pedal, since the vehicle is at first held in place, being partially powered by the residual drive torque of the motor, which is transmitted to the driving wheels. If now, the transmission shifts into the standby mode, this shift is itself evident by a release impact, which is unpleasantly detected by the driver. Further, at this moment, the drivetrain becomes torque-free so that the driver, under certain circumstances, then presses even harder on the brakes in order to prevent a rolling of the vehicle.

With this above stated background, the present invention proposes a method, where the above described disadvantages are avoided. These disadvantages are ineffective fuel consumption, poor cooling, during both the stopping process and the period of standstill, the undesirable release impact and unrestrained, downhill back-rolling of the vehicle.

SUMMARY OF THE INVENTION

The invention is based on the fact that in a case of expressed desire to stop, a continuation of a drive connection between the motor and the drive wheels, is not only unnecessary, but can allow the above described disadvantages to occur.

Accordingly, the invention makes a method possible for shifting an automatic transmission of a motor vehicle with a hydrodynamic converter upon stopping of the motor vehicle from an active driving state where, following a defined predetermined stopping procedure, the transmission shifts into the standby mode.

For the achievement of the stated purpose, provision has been made that even during active driving under defined, predetermined stopping conditions, the transmission shifts into the standby mode.

These stopping conditions become evident when, due to certain actions undertaken by the driver, his desire to stop is realized and the vehicle is caused to delay its forward progress. In such a case, the transmission shifts into the standby mode, where the transfer of torque in the power train is interrupted.

As a result of this interruption in the power train, no significant traction torque is generated, either during a delaying phase or during a vehicle standstill, which must be compensated for by braking. Accordingly, up to this point, no inefficient fuel consumption has occurred. Moreover, after the stop, both the release impact as well as a change of torque has been eliminated.

Since, during the stopping procedure, torque is not passed to the driven wheels, brake pressure produced by the driver will be evenly apportioned between the driven wheels and the free wheel pair. Consequently, concern is not necessary in regard to any deficient braking capacity at the driving wheels.

As an additional advantage, there is no heat-loss in the converter, which would otherwise bring about the above cited cooling problems.

In a preferred embodiment of the inventive method, provision has been made that the predetermined stopping conditions are to encompass:
a) the gas pedal is not to be activated, and
b) the brake is applied.

These conditions clearly characterize a driver's wish for stopping the vehicle.

Changing of the gears into the standby mode occurs according to a preferred embodiment of the invention, only under such circumstances where, the speed of rotation of the turbine has decreased to a speed less than that of the pump. In this situation, an operational condition for tractional drive torque has been created which, as has been explained above, should be avoided.

As mentioned above, the shift change into the standby mode is done advantageously, if the rotational speed of the turbine is less than the rotational speed of the pump by an amount within the range of 100 to 200 RPM, preferably approximately 150 RPM. This condition lies clearly lower than the uncontrolled, torque-deficient situation which obtains when speeds are equal. Consequently, the shift change is not difficult to detect.

According with another embodiment of the invention, where the automatic transmission has an integral retarder or is separately connected thereto, provision has been made that, prior to shifting into the standby mode, the retarder is automatically shifted out so that the braking procedure could be carried out solely by brakes operated by the driver. The retarder would advantageously be shifted out as soon as the rotational speed of the turbine, which is coupled in the transmission with the drive wheels, drops below the rotational speed of the pump, which is directly connected to the motor.

BRIEF DESCRIPTION OF THE DRAWINGS

The invention will now be described, by way of example, with reference to the accompanying drawings in which.

DETAILED DESCRIPTION OF THE INVENTION

Figure 1:
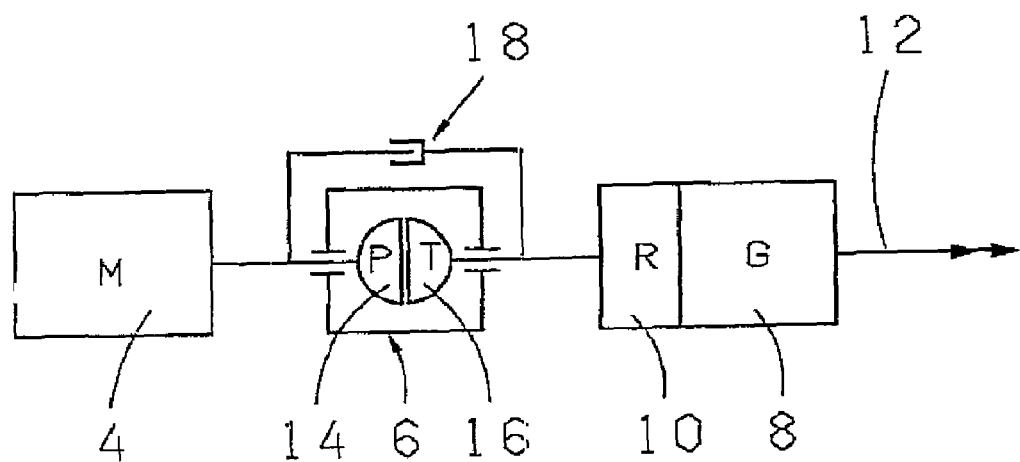
FIG. 1 is a schematic view of a portion of the drivetrain equipment of a motor vehicle with an automatic transmission and a hydrodynamic converter.

The schematically presented driving train 2 of FIG. 1 encompasses a vehicle motor 4, a hydrodynamic converter 6 located after the said motor and an automatic transmission 8 which is operably connected to the converter 6, to which a retarder 10 is added. The transmission/retarder unit 8, 10 is connected by way of an output shaft 12 to the driven wheels (not shown) of the motor vehicle. The retarder 10 serves in a known manner as a wear-free operating auxiliary braking system for more extensively prolonged braking procedures. In this manner, it is possible for the brake to be protected from unnecessary wear and thus any "fading" thereof is avoided so that braking remains at full capacity and operationally ready for safe operation.

The converter 6 essentially encompasses a hydraulic pump 14, which is directly connected with the motor 4, the output flow of the pump 14 drives a turbine 16 of the transmission 8, after which the flow continues within the hydraulic circuit (not shown).

As may be further inferred from FIG. 1, it is possible that the hydraulic converter 6 can be bypassed by way of an automatic mechanical clutch 18 so that, upon continual driving operation, converter slip is avoided. The converter 6, the transmission 8, the retarder 10 and the clutch 18 can be manufactured as a one-piece assembly.

The automatic transmission 8 possesses, where modern motor vehicles are concerned, generally at least two or more forward gear ratios, in order to transfer power more precisely matching the optimal operating range of the motor. Accordingly, in the present case, an automatic transmission with two forward gear ratios is employed as an example for description.

Figure 2:
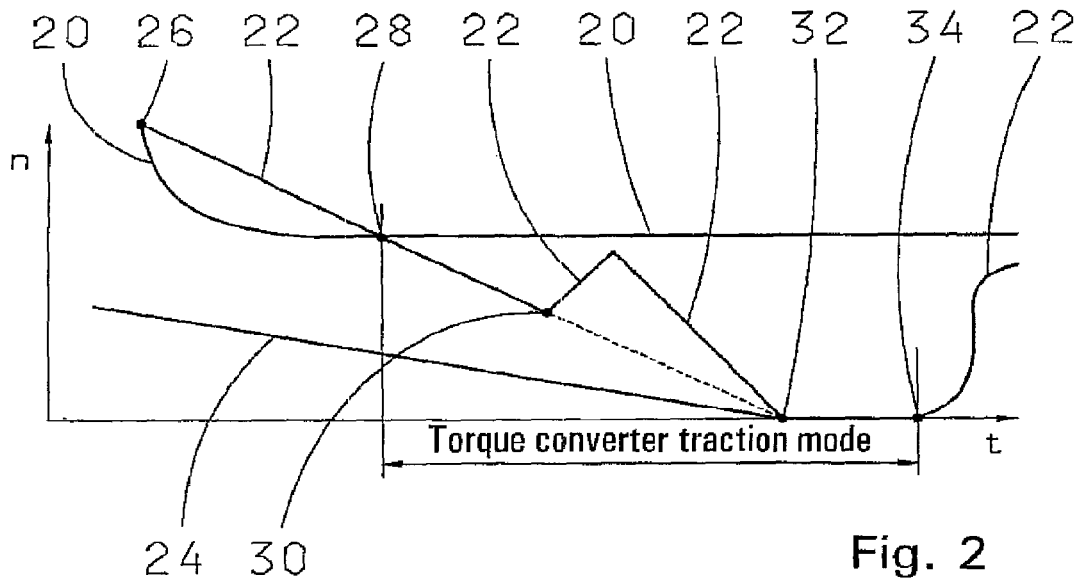
FIG. 2 is a speed of rotation vs. time graph for a shifting method according to the state of the technology.

FIG. 2 shows, in a rotational speed vs. time graph, a conventional stopping procedure with a typical motor vehicle in accord with the state of technology. In the case of known automatic transmissions, a defined gear ratio remains during the stopping operation even until the vehicle comes to standstill. After the expiration of a predetermined dwell time, following the stationary condition of the vehicle, the transmission shifts into the standby mode according with the given stopping conditions (that is, when the brake is activated).

In FIG. 2, the rotational speed of the motor 4, shown in a curve 20, is also the rotational speed of the connected hydraulic pump 14. The rotational speed of the turbine 16 is depicted by a curve 22 and a curve 24 shows the rotational speed of the output shaft 12, which is bound to the drive wheels.

Should the driver relieve pressure on the accelerator pedal and subsequently brake the vehicle then, at point 26, the mechanical clutch 18 disengages so that the torque of the power train is once again passed through the slip connection between the pump 14 and the turbine 16 and, accordingly, through the converter 6. The rotational speed 20 of the motor and the rotational speed of the rigidly fixed pump 16 accordingly decline and stabilize themselves, as is seen in FIG. 2 in the horizontal line indicating a torque-free rotation.

Simultaneously, the vehicle is braked so that the rotational speed 22 of the turbine 16 decreases, wherein turbine is bound to the drive wheels through the transmission 8. Since the rotational speed 20 of the motor 4 at first decreases more quickly than the rotational speed 22 of the turbine, the converter is obliged to operate in the thrust torque mode, where the motor performs a self-braking effect.

In the range of rotational speed equality of the motor and the turbine, at point 28, the converter 6 is free of torque. If the vehicle is further braked and, once again, the turbine rotational speed 22 further decreases, then the converter 6 drops into an idling torque mode, i.e., the surplus drive of the motor 4, which now runs in the idling mode, must now be subjected to additional braking by way of the brakes. In this area, generally speaking, downshifting is carried out. In the example depicted in FIG. 2, at a point 30, a downshift from the second gear ratio to the first gear ratio is shown. The result of this is that the turbine rotational speed 22 immediately surges, only to peak and then decline. The gear ratio in the first gear ratio is greater than the gear ratio in the second gear ratio, which reinforces the above described effect.

At point 32, the vehicle comes to a standstill. Accordingly the output rotational speed 24 and the turbine rotational speed 22 both stand at zero.

After the expiration of a defined, preselected (dwell) time period, in FIG. 2, at a point 34, the automatic transmission 8 now shifts into the standby mode. In other words, the power flow is interrupted so that the turbine 16, by way of the pump 14, can be accelerated to a rotational speed 22, which is somewhat equivalent to the rotational speed 20 of the motor.

Figure 3:
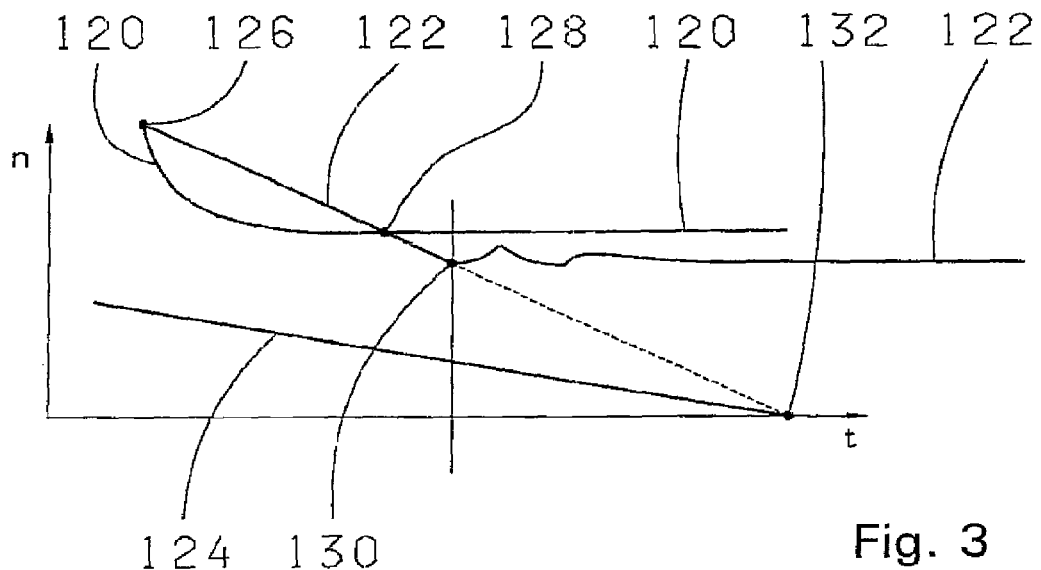
FIG. 3 is a graph, similar to that of FIG. 2, for an inventive shifting method.

Now giving consideration to FIG. 3, which is a presentation of the inventive method, at a point 126, once again the mechanical clutch 18 is disengaged and the converter 6 is activated. As in the example of FIG. 2, the converter 6 operates in the thrust torque mode, until, at a point 128, the converter is free of torque throughput and goes over to a tractional torque stage.

If a rotational speed 122 of the turbine drops below a preset rotational speed 120 RPM of the motor (see point 130 in FIG. 3), then the automatic transmission 8 will directly shift out of a current gear ratio, this being, in the present instance, out of the second gear ratio into the standby mode so that the power flow maintains its continuity and the turbine 16 is, likewise, excluded therefrom. In the case of a retarder, at this point, this must be shifted out not later than the shift into the standby mode.

The turbine 16, which is rotating more or less without resistance, can now be carried along by the pump 14 where, principally, a small rotational speed differential now exists, which is caused by the adjustably regulated slip between the rotational speed 120 RPM of the now free running motor 4 and the rotational speed 122 RPM of the turbine 16. In an area now characterized by pulling torque, to be found in FIG. 3 to the right of point 128, can be found the smallest possible tractional torque in the converter so that, essentially, no additional braking effort must be expended for the vehicle.

If the stopping conditions continue further, i.e., if the brakes are activated, then the vehicle, at a point 132 of the graph as a result of the retarding action of the brakes, comes to a standstill, where the output rotational speed 124 immediately becomes zero. On this account no relief impact occurs and no unexpected backroll takes place.

If the vehicle is braked in the second gear ratio then, at a predetermined driving speed, the shifting elements of the automatic transmission convert from the second gear ratio into the first gear ratio so that, during continued travel, the first gear ratio is immediately available.

Prior to the change of the shifting elements, if an acceleration occurs then the vehicle assumes the second gear ratio and, if necessary, a downshift (RS-2-1) from this second gear into the first gear ratio may be necessary.

Since, in a situation where freedom from either a thrust or a tractional situation could be imminent and transition into the standby mode can be made, then any additional braking, accelerating or stopping of the vehicle becomes exclusively an activity of the driver. The torque conditions in the power gear train, thus a gear ratio shift into the standby mode, by way of a re-engagement of a gear ratio are done in conformation with the driver's wish or are in relation to the direction of movement of the vehicle. Should the vehicle roll backwards, which can be determined by the rotational direction sensor, then likewise the standby mode would be abandoned. If the driver brakes, then the standby mode is again established. Conversely, should a driver apply the gas pedal, then the standby mode is shifted out and a gear ratio is engaged.

| Reference numerals | |
|---|---|
| 2 | drive gear chain |
| 4 | motor |
| 6 | hydraulic converter |
| 8 | automatic transmission |
| 10 | retarder |

-continued

| Reference numerals | |
|---|---|
| 12 | output shaft |
| 14 | hydraulic pump |
| 16 | turbine |
| 18 | mechanical clutch |
| 20 | motor speed of rotation (in RPM) |
| 22 | turbine speed of rotation (in RPM) |
| 24 | speed of rotation of the output shaft (in RPM) |
| 26 | converter clutch, open |
| 28 | torque-free condition |
| 30 | downshift from second gear ratio into the first gear ratio (RS 2-1) |
| 32 | standstill (of vehicle) |
| 34 | shifting into standby mode |
| 120 | motor speed of rotation (RPM) |
| 122 | turbine speed of rotation (RPM) |
| 124 | output shaft speed of rotation (RPM) |
| 126 | converter clutch, open |
| 128 | torque-free condition |
| 130 | shifting into standby mode |
| 132 | standstill (of vehicle) |

The invention claimed is:

1. A method of shifting an automatic transmission of a motor vehicle having a hydrodynamic converter (6), the method comprising the steps of:
   detecting a presence of predetermined stopping conditions;
   determining that a driver of the motor vehicle intends to cause the motor vehicle to change from a driving state to a stopped state, based on the presence of one of the predetermined stopping conditions;
   automatically shifting the automatic transmission (8) into a standby mode, before the driving state has concluded; and
   shifting into the standby mode when a speed of rotation (122) of the hydrodynamic converter (6) decreases to less than a rotational speed (120) of a motor.

2. The method according to claim 1, further comprising the step of defining the predetermined stopping conditions as:
   a) when the gas pedal is not activated, and
   b) when the service brake is activated.

3. The method according to claim 1, further comprising the step of shifting into the standby mode when a rotational speed (122) of a turbine (16) is rotating in a range of between 100 to 200 RPM less than the rotational speed (120) of the motor.

4. A method of shifting an automatic transmission of a motor vehicle having a hydrodynamic converter (6), the method comprising the steps of:
   detecting a presence of predetermined stopping conditions;
   determining that a driver of the motor vehicle intends to cause the motor vehicle to change from a driving state to a stopped state, based on the presence of one of the predetermined stopping conditions;
   automatically shifting the automatic transmission (8) into a standby mode, before the driving state has concluded; and
   disengaging a retarder apparatus (10) of the automatic transmission no later than a time by which shifting into the standby mode occurs.

5. The method according to claim 4, further comprising the step of shiftably releasing the retarder apparatus (10) when a positive converter slip occurs.

6. A method of shifting an automatic transmission of a motor vehicle having a hydrodynamic torque converter (6), the method comprising the steps of:
   defining, as a condition indicating stopping of the motor vehicle, at least one of a release of an accelerator pedal and an engagement of a brake;

recognizing the condition indicating stopping of the motor vehicle;

automatically shifting the automatic transmission into neutral upon recognition of the at least one condition indicating stopping of the motor vehicle; and automatically shifting the automatic transmission into neutral when a rotational speed (122) of the hydrodynamic converter (6) decreases to less than a rotational speed (120) of a motor.

7. The method according to claim 6, further comprising the step of automatically shifting the automatic transmission into neutral when a rotational speed (122) of a turbine (16) of the hydrodynamic converter (6) is rotating within a range between 100 to 200 RPM less than the rotational speed (120) of the motor.

8. A method of shifting an automatic transmission of a motor vehicle having a hydrodynamic torque converter (6), the method comprising the steps of:

defining, as a condition indicating stopping of the motor vehicle, at least one of a release of an accelerator pedal and an engagement of a brake;

recognizing the condition indicating stopping of the motor vehicle;

automatically shifting the automatic transmission into neutral upon recognition of the at least one condition indicating stopping of the motor vehicle; and disengaging a retarder apparatus (10) of the automatic transmission at least by a time that the automatic transmission is automatically shifted into neutral.

9. The method according to claim 8, further comprising the step of disengaging the retarder apparatus (10) once slip occurs within the hydrodynamic converter (6).

* * * * *